UNITED STATES PATENT OFFICE 2,328,976

RUBBER HYDROCHLORIDE

Albert F. Hardman, Akron, Ohio, assignor to Wingfoot Corporation, Akron, Ohio, a corporation of Delaware No Drawing. Application June 26, 1940,
Serial No. 342,593

7 Claims. (Cl. 260—771)

This invention relates to the compounding of rubber hydrochloride and more particularly to the use of compounds of high efficiency in preventing the photochemical deterioration of the rubber hydrochloride.

It is known that rubber hydrochloride is subject to a form of deterioration which is caused or accelerated by the action of light, particularly ultra violet light, and various materials for retarding or inhibiting this deterioration have been suggested. It has now been discovered that a class of compounds obtainable by reacting polyalkylenepolyamines with a di(haloethyl) ether are very effective inhibitors of the photochemical deterioration of rubber hydrochloride and will impart to the rubber hydrochloride such stability that rubber hydrochloride containing these compounds has a useful life substantially in excess of the life of previously described rubber hydrochloride compositions.

phatic or alicyclic radicals such as the cyclohexyl radical, ring substituted aliphatic radicals such as the aralkyl, furfuryl and tetrahydrofurfuryl radicals and any other modified aliphatic radical in which, for purposes of the present invention, the radical possesses predominantly aliphatic characteristics. When such a polyalkylenepolyamine is reacted with a di(haloethyl) ether, hydrogen halide is given off and a complex product is obtained. The composition of this product is not known with certainty but it is believed that the terminal halogen atoms of the ether react with one or more of the primary amino groups of the polyalkylenepolyamine to produce a morpholyl structure. Such a reaction could take place in a number of ways depending in part upon the proportions of reactants used. The following equations show possible mechanisms of reaction using diethylenetriamine and di(chlorethyl) ether as representative starting materials:

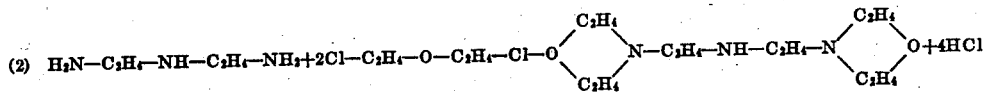

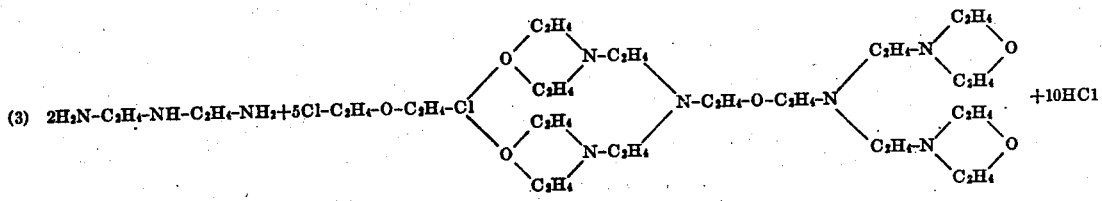

The polyalkylenepolyamines employed in the invention are those in which one or both of the terminal amino groups is primary amino. Such polyalkylene polyamines may be more particularly represented by the structural formula

in which R and R₃ are selected from the group consisting of hydrogen and aliphatic radicals, R₁ and R₂ are alkylene radicals and x is a whole number, preferably between one and ten. The more readily available and preferred materials are those in which R₃ is specifically hydrogen. Here and elsewhere in the specification and claims, the term "aliphatic" includes saturated and unsaturated, straight and branched chain aliphatic radicals. Also included are cycloali- It should be understood that these equations represent only suggested reactions and, in fact, other or additional reactions may take place. In using the materials as photochemical inhibitors, they may be separated into fractions and any fraction used or composite mixtures of components may be employed.

The practice of the invention is illustrated by the following examples.

Example 1

One hundred and three grams (1 mol) of diethylene triamine were placed in a flask fitted with a reflux condenser, a thermometer and a stirrer and 143 grams (1 mol) of β,β' di(chlorethyl) ether were added slowly, the temperature being maintained at about 70° C. When approximately half of the ether had been added, the reaction mixture became rather viscous due to the formation of hydrochlorides and, therefore, at this point 110 cc. of alcohol and about 27 grams (0.67 mol) of sodium hydroxide pellets were added. The mixture was gently refluxed for ½ hour and the remainder of the ether was then added slowly. After an additional ½ hour of heating, about 53 grams (1.33 mol) of sodium hydroxide pellets were added in small portions over a period of 45 minutes and the heating was further continued for an hour and three-quarters. The alcohol was then removed by distillation and the liquid product was filtered from the salt formed during the reaction. The crude product was distilled at 5 mm. pressure and the portion boiling at 130–190° C. was collected. The thus purified product was a straw-colored liquid which is believed to have been principally N($\beta$-morpholylethyl) ethylene diamine having the following structure:

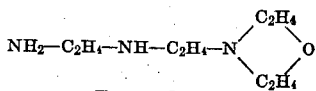

Example 2

Two hundred eighty-six grams (2 mols) of di-(chlorethyl) ether were added to 103 (1 mol) of diethylenetriamine and 150 cc. of alcohol. After standing for several hours, the mixture was refluxed and 180 grams (4.5 mols) of sodium hydroxide pellets were added in small portions over a period of one hour after which the heating and stirring were continued for an additional 1½ hours. The salt formed during the reaction was filtered off and most of the alcohol was removed by distillation at atmospheric pressure. The crude product was then distilled at approximately 5 mm. pressure and the portion boiling at 145–220° C. was collected. This product is believed to have been largely di(morpholylethyl) amine having the following structural formula:

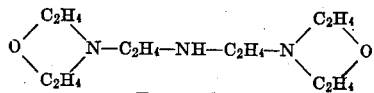

Example 3

Two hundred six grams (1.44 mols) of di-(chlorethyl) ether were added to 59.2 grams (0.58 mol) of diethylenetriamine and 100 cc. of alcohol and the mixture was refluxed with stirring for 40 minutes. One hundred fifteen grams (2.88 mols) of sodium hydroxide pellets were then added in small portions over a period of 1¼ hours and the refluxing and stirring were continued for 2½ hours. Salt formed in the reaction was then filtered off and the alcohol was removed by distillation at atmospheric pressure. The following fractions were obtained by distillation at 5 mm. pressure.

(1) 80–140° C.—13 grams colorless liquid
(2) 140–175° C.—24 grams yellow liquid
(3) 175–200° C.—20 grams orange liquid
(4) 200–300° C.—28 grams reddish, fluorescent liquid
(5) Above 300° C.—6 grams residue Fraction 1 boiling below 140° C. at 5 mm. pressure, composed principally of unchanged reactants and undesirable by-products, is usually discarded and the remainder may be used in fractions or in toto as a photochemical inhibitor for rubber hydrochloride.

Example 4

One hundred forty-three grams (1 mol) of di-(chlorethyl) ether was added to a mixture of 189 grams (1 mol) of tetraethylene-pentamine and 250 cc. of alcohol and the mixture was allowed to stand for several hours. The mass was then heated to refluxing and stirred and 80 grams (3 mols) of sodium hydroxide pellets were added in small portions over a period of one hour. Refluxing was continued for an hour, 30 grams (0.75 mol) of sodium hydroxide were added, and the refluxing was then continued for an additional ½ hour. The salt formed in the reaction and the alcohol were removed and the crude product was distilled at a pressure of 5–6 mm., the fraction boiling at 162–285° C. being collected as product.

Example 5

Two hundred eighty-six grams (2 mols) of di-(chlorethyl) ether were added to 189 grams (1 mol) of tetraethylenepentamine and 220 cc. of alcohol, and 90 grams (2.25 mols) of sodium hydroxide pellets were added. The mixture was refluxed with stirring for 45 minutes, 70 grams (1.75 mols) of sodium hydroxide were added and the refluxing was then continued for one hour. The salt formed and the alcohol were removed and the crude product was distilled at 6–8 mm. pressure. The material coming over at 60–175° C. was discarded and the residue (a dark red, fluorescent liquid) was collected as product. It is believed to have been largely N,N''-di(morpholylethyl) diethylene triamine having the following structural formula:

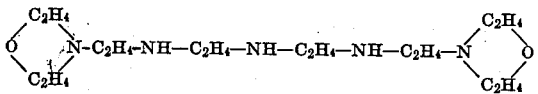

Example 6

Two hundred sixteen grams (1.5 mols of di-(chlorethyl) ether were reacted with 95 grams (0.5 mol) of tetraethylenepentamine in 220 cc. of alcohol in a manner similar to that employed in the foregoing examples. One hundred twenty grams (3 mols) of sodium hydroxide pellets were added in 5–10 gram portions over a period of 1½ hours after which the mixture was refluxed for 6 hours. The salt formed and the alcohol were removed and the crude product was distilled at approximately 8 mm. pressure. The portion boiling below 175° C. was discarded and the residue (a reddish, fluorescent liquid) was collected as product.

As previously stated, it is believed that the product obtained by the reaction of the polyalkylenepolyamine and the di(haloethyl) ether consists predominantly of morpholine type compounds, as illustrated by Equations 1 to 3 and the structural formulae suggested for some of the specific examples, and that the predominant product can be controlled to a large degree by the choice of proportions of reactants. As a matter of fact, however, the products probably consist of mixtures of various morpholyl compounds and possibly other types of compounds. Regardless of their actual composition and constitution, the composite products may be used as photochemical inhibitors for rubber hydrochloride or, if desired, they may be separated into components and one or more of the components so used.

As a general rule, in order to secure a substantial amount of the desired product, at least one mol of di(haloethyl) ether is used for each mol of polyalkylene polyamine but lesser amounts may also be used. Greater amounts of the ether may also be used, the portion which will react being determined in part by the choice of polyalkylene polyamine. The higher polyalkylene polyamines are capable of reacting at a greater number of points. Use of abnormal proportions of either reactant merely results in some unreacted starting material in the product.

The temperature is not critical so long as the reaction is caused to proceed and decomposition temperatures are avoided. Moderate temperatures, such as reflux temperatures of water, alcohol and other commonly employed solvents, are generally satisfactory.

Di(bromoethyl) ether may be employed in place of the di(chlorethyl) ether of the examples. Substituted di(haloethyl) ethers, such as di(chlorisopropyl) ether, may also be employed. Various other polyalkylenepolyamines may be used in place of those employed in the examples. Further examples are di(n-propylene) triamine, di-isopropylene triamine, N-hexyl tetraethylene pentamine, tetra-isobutylene pentamine, hexaethylene heptamine, N-cyclohexyl tri-isopropylene tetramine and N-benzyl diethylene triamine. The products obtained from the higher polyalkylenepolyamines are less volatile and more permanent compounds and, in general, are the most effective photochemical inhibitors and consequently are preferred materials in the practice of the invention.

As stated above, the polyalkylenepolyamines employed have at least one primary amino-radical as a terminal amino group. The simple, unsubstituted polyalkylenepolyamines are satisfactory starting materials. In addition to these compounds, however, polyalkylenepolyamines in which the connecting amino groups are not secondary but have been converted into tertiary amino groups by the addition of substituents such as alkyl, aryl, aralkyl and the like radicals may also be employed. Alternatively, and as a practical matter preferably, such substituent groups can be added conveniently by reacting the di(haloethyl) ether with an unsubstituted polyalkylenepolyamine and thereafter treating the reaction product with a halide of the desired substituent, such as an alkyl halide, an aryl halide or an aralkyl halide. The preparation of such compounds is illustrated by the following examples.

*Example 7*

Thirty-seven and three-tenths grams of the product of Example 2 (0.15 mol assuming it to be di(morpholylethyl)amine) were heated to 90° C. and about 13 grams (0.08 mol) of hexyl bromide were added slowly with stirring. After approximately 20 minutes 80 cc. of alcohol and about 3 grams (0.08 mol) of sodium hydroxide were added and the mixture was refluxed for 20 minutes. Another 13 grams (0.08 mol) of hexyl bromide were added and, after another 20-minute interval about 3 grams (0.08 mol) of sodium hydroxide were added. The mixture was then refluxed for 2½ hours. The sodium bromide formed was filtered off and the alcohol was removed by distillation. The residue was a brownish liquid which is believed to have consisted largely of a product having the following structural formula:

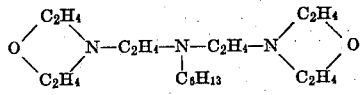

*Example 8*

Forty-three grams of the product of Example 5 (0.13 mol assuming it to be N,N''-di-morpholyl-ethyl) diethylene triamine) were heated to refluxing with 50 cc. of alcohol. Twenty-one and a half grams of hexyl bromide (0.13 mol) and 5.2 grams (0.13 mol) of sodium hydroxide pellets were then added alternately in small portions over a 35-minute period. The refluxing was continued for one and ¾ hours, a 3-gram (0.075 mol) excess of sodium hydroxide was added and the refluxing was then continued for another 1¼ hours. The sodium bromide and alcohol were removed. The product consisted of a reddish, slightly fluorescent liquid.

*Example 9*

Fifty-three grams of the product of Example 5 (0.16 mol assuming it to be N,N''-di(morpholylethyl) diethylene triamine) and 75 cc. of alcohol were refluxed with stirring and 53.1 grams (0.33 mol) of hexyl bromide and 12.4 grams (0.31 mol) of sodium hydroxide pellets were added alternately in small portions over a period of 1¼ hours. The refluxing was then continued for 1¼ hours, 6½ grams (0.16 mol) of sodium hydroxide were added and the heating was continued for an additional 1½ hours. The sodium bromide and alcohol were removed by filtration and distillation. The product was a slightly viscous liquid obtained in 92% yield.

*Example 10*

Fifty-two and 9/10 grams of the product of Example 4 (0.16 mol assuming it to be N,N''-di(morpholylethyl) diethylene triamine) were reacted with 33.7 grams (0.21 mol) of hexyl bromide as follows:

Approximately one half of the hexyl bromide was added over 20 minutes, the reaction mixture being heated on a steam bath. Ninety cc. of alcohol were then added followed by 8.2 grams (0.21 mol) of sodium hydroxide pellets and the remainder of the hexyl bromide in alternate small portions, the latter additions being made over a period of one hour. Refluxing was then continued for 2½ hours, the sodium bromide was filtered off and the alcohol was removed by distillation. The product was a reddish liquid obtained in 93% yield.

*Example 11*

Forty-two and one half grams of the product of Example 4 (0.16 mol assuming it to be N-morpholylethyl triethylene tetramine) were reacted with 54.2 grams (0.33 mol) of hexyl bromide as follows:

Approximately one third of the hexyl bromide was added over a 20-minute period, the reaction mixture being heated to 98° C. The heating was continued for 15 minutes and 100 cc. of alcohol were added. The remainder of the hexyl bromide and 13.2 grams (0.33 mol) of sodium hydroxide pellets were then added in alternate small portions over a period of one hour. Refluxing was then continued for 2½ hours and the sodium bromide and alcohol were removed. The product was a reddish liquid obtained in a yield of 95%.

Various other alkyl, aryl and aralykyl substituents may be added to the photochemical inhibitors in similar manner by the use of the halide of the desired substituent.

The effectiveness of the inhibitors of the invention was tested as follows:

A solution of rubber hydrochloride containing 7% dibutyl phthalate (based on the rubber hydrochloride) as a plasticizer was used. To this cement 7½% of the inhibitor (based on the rubber hydrochloride) was added. Films approximately 0.001 of an inch thick were cast from the compounded cement and were exposed to ultraviolet light in a Fadeometer, together with a control film identical except that it contained no inhibitor, and the time of exposure necessary to produce failure of the film was determined in each case. The following table shows the relative life of a number of films containing representative inhibitors selected from those prepared according to the foregoing examples, the life being expressed as a percentage of the life of the control.

| Example No.— | Per cent of control |
|---|---|
| 2 | 261 |
| 3 | 404 |
| 5 | 787 |
| 6 | 386 |
| 7 | 274 |
| 8 | 518 |
| 9 | 543 |
| 10 | 515 |
| 11 | 355 |

The foregoing test films contained plasticizer since most commercial films for use as wrapping materials contain such plasticizers. However, the inhibitors are equally effective in unplasticized film.

The photochemical inhibitors of the invention may be employed with various types of rubber hydrochloride. Inasmuch as the problem of photochemical deterioration is especially noticeable in thin films, the invention is particularly applicable to such films and especially to films suitable for wrapping and analogous purposes, such as films having a thickness of about 0.0003 to 0.003 inch. If desired, such films may contain plasticizers, dyes, pigments or other compounding ingredients.

The inhibitors are customarily used in small amount, e. g. not more than 10% by weight, based on the rubber hydrochloride. Higher amounts have an increased tendency to "bloom" out onto the surface of the film and it is desirable to keep the quantity as low as possible, consistent with the protection required. For many purposes, amounts ranging from one to three percent by weight, based on the rubber hydrochloride, are satisfactory.

What I claim is:

1. Rubber hydrochloride containing, in amount sufficient to inhibit photochemical deterioration, a reaction product of a di(haloethyl) ether and a polyalkylene polyamine in which at least one of the terminal amino groups is primary amino.

2. Rubber hydrochloride containing, in amount sufficient to inhibit photochemical deterioration, a reaction product of a di(haloethyl) ether and a compound having the structural formula

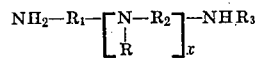

in which R and R₃ are selected from the group consisting of hydrogen and aliphatic radicals, R₁ and R₂ are alkylene radicals and $x$ is a whole number from 1 to 10, inclusive.

3. Rubber hydrochloride containing, in amount sufficient to inhibit photochemical deterioration, a reaction product of a di(chlorethyl) ether and a compound having the structural formula

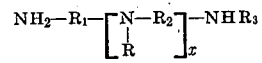

in which R and R₃ are selected from the group consisting of hydrogen and aliphatic radicals, R₁ and R₂ are alklene radicals and $x$ is a whole number from 1 to 10, inclusive.

4. Rubber hydrochloride containing, in amount sufficient to inhibit photochemical deterioration, a morpholyl compound obtained by reacting a di(haloethyl) ether and a compound having the formula

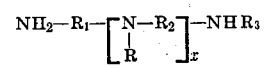

in which R and R₃ are selected from the group consisting of hydrogen and aliphatic radicals, R₁ and R₂ are alkylene radicals and $x$ is a whole number from 1 to 10, inclusive.

5. Rubber hydrochloride containing, in amount sufficient to inhibit photochemical deterioration, a reaction product of a di(haloethyl) ether and a compound having the structural formula

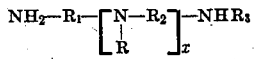

in which R and R₃ are selected from the group consisting of hydrogen and aliphatic radicals, R₁ and R₂ are alkylene radicals and $x$ is a whole number from 1 to 10, inclusive, said materials being reacted in the proportion of at least one mol of the ether to each mol of the amine.

6. Rubber hydrochloride containing, in amount sufficient to inhibit photochemical deterioration, the composite reaction product of a di(haloethyl) ether and a compound having the structural formula

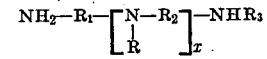

in which R and R₃ are selected from the group consisting of hydrogen and aliphatic radicals, R₁ and R₂ are alkylene radicals and $x$ is a whole number from 1 to 10, inclusive.

7. Rubber hydrochloride containing, in amount sufficient to inhibit photochemical deterioration, a morpholyl compound obtained by reacting, with attendant splitting out of hydrogen halide, a di(haloethyl) ether and a compound having the formula

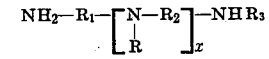

in which R and R₃ are selected from the group consisting of hydrogen and aliphatic radicals, R₁ and R₂ are alkylene radicals and $x$ is a whole number from 1 to 10 inclusive.

ALBERT F. HARDMAN.

Certificate of Correction

Patent No. 2,328,976. September 7, 1943.

ALBERT F. HARDMAN

It is hereby certified that errors appear in the printed specification of the above numbered patent requiring correction as follows: Page 1, lines 21 to 37 inclusive, strike out the formula and insert instead the following—

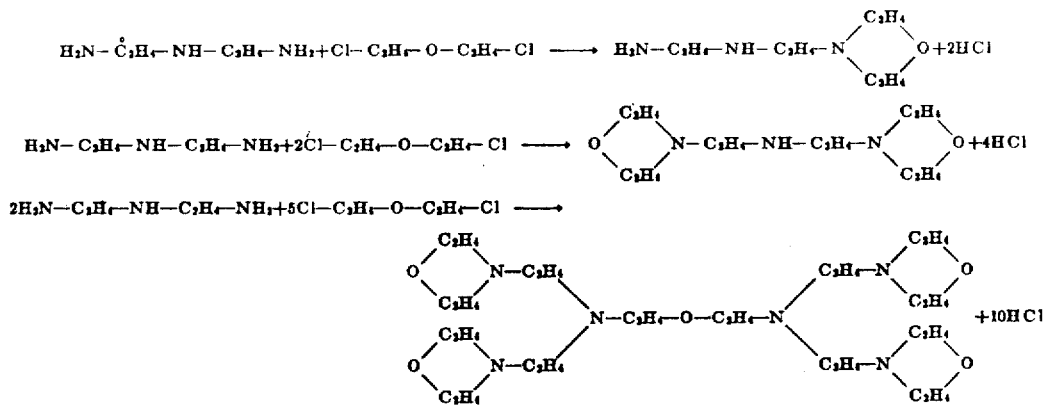

page 2, first column, line 27, after "103" insert *grams*; and second column, line 5, for "3 mols" read *2 mols*; and that the said Letters Patent should be read with these corrections therein that the same may conform to the record of the case in the Patent Office.

Signed and sealed this 23rd day of November, A. D. 1943.

[SEAL]

HENRY VAN ARSDALE,
*Acting Commissioner of Patents.*